(12) United States Patent
Rediger

(10) Patent No.: US 10,118,983 B2
(45) Date of Patent: Nov. 6, 2018

(54) TREATED ALDEHYDE-BASED RESINS CONTAINING POLYAMINES AND METHODS FOR MAKING AND USING SAME

(71) Applicant: Georgia-Pacific Chemicals LLC, Atlanta, GA (US)

(72) Inventor: Richard A. Rediger, Conyers, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 110 days.

(21) Appl. No.: 15/094,550

(22) Filed: Apr. 8, 2016

(65) Prior Publication Data

US 2016/0297916 A1  Oct. 13, 2016

Related U.S. Application Data

(60) Provisional application No. 62/146,230, filed on Apr. 10, 2015.

(51) Int. Cl.
| | |
|---|---|
| *C08G 8/28* | (2006.01) |
| *C08G 14/12* | (2006.01) |
| *C08L 61/14* | (2006.01) |
| *C09K 8/80* | (2006.01) |
| *C08G 14/06* | (2006.01) |
| *C09D 161/14* | (2006.01) |
| *C09D 161/34* | (2006.01) |
| *C08L 61/34* | (2006.01) |

(52) U.S. Cl.
CPC .............. *C08G 8/28* (2013.01); *C08G 14/06* (2013.01); *C08L 61/14* (2013.01); *C08L 61/34* (2013.01); *C09D 161/14* (2013.01); *C09D 161/34* (2013.01); *C09K 8/805* (2013.01)

(58) Field of Classification Search
CPC .................................. C08G 8/28; C08L 61/14

USPC ................................................... 528/129, 162
See application file for complete search history.

(56) References Cited

U.S. PATENT DOCUMENTS

| | | | | |
|---|---|---|---|---|
| 2,482,498 | A * | 5/1946 | Nagel ................ | C08G 528/129 |
| 2,934,511 | A * | 4/1960 | Auerbach ............... | C08G 8/04 |
| | | | | 260/DIG. 14 |
| 2,937,159 | A * | 5/1960 | McKay .................. | C08G 14/06 |
| | | | | 524/252 |
| 3,549,365 | A * | 12/1970 | Thomas ................... | B41N 3/03 |
| | | | | 101/453 |
| 2007/0215354 | A1 | 9/2007 | Rickman et al. | |
| 2012/0295114 | A1* | 11/2012 | Rediger et al. ..... | C08L 428/404 |
| 2014/0162911 | A1 | 6/2014 | Monastiriotis et al. | |

FOREIGN PATENT DOCUMENTS

| | | |
|---|---|---|
| EP | 1464789 | 10/2004 |
| GB | 918735 | * 2/1963 |
| WO | 2013/112251 | 8/2013 |

OTHER PUBLICATIONS

International Search Report for Int'l Application No. PCT/US2016/02684, dated Jul. 21, 2016.

* cited by examiner

*Primary Examiner* — Tae H Yoon
(74) *Attorney, Agent, or Firm* — Ram W. Sabnis

(57) ABSTRACT

Treated aldehyde-based resins containing one or more polyamines and methods for making and same. The treated aldehyde-based resin can be or include an aldehyde-based resin and a polyamine. The polyamine can be or include one or more aromatic polyamines, one or more poly($C_2$-$C_5$ alkylene) polyamines, or a mixture thereof. The treated aldehyde-based resin can include about 0.05 wt % to about 10 wt % of the polyamine, based on a solids weight of the aldehyde-based resin.

20 Claims, No Drawings

TREATED ALDEHYDE-BASED RESINS CONTAINING POLYAMINES AND METHODS FOR MAKING AND USING SAME

CROSS-REFERENCE TO RELATED APPLICATIONS

This application claims priority to U.S. Provisional Patent Application No. 62/146,230, filed on Apr. 10, 1015, and to U.S. Provisional Patent Application No. 62/146,234, filed on Apr. 10, 2015, which are both incorporated by reference herein.

BACKGROUND

Field

Embodiments described generally relate to resins and methods for making and using same. More particularly, such embodiments relate to treated aldehyde-based resins containing polyamines and methods for making and using same.

Description of the Related Art

Resins can be used to coat and protect a variety of items, such as the outer surfaces of proppants or the inner surfaces of pipes or conduits. The resin, therefore, must be able to withstand exposure to whatever environment the coated item is used in. For example, a resin coated on proppants must withstand being crushed or disintegrated despite that the coated proppants are injected into fractures within subterranean formations that can have a closure pressure of about 34.5 MPa (about 5,000 psi) or greater. At such pressure, proppants having traditional resin coatings can be crushed and the resulting fines from the crushed proppant can migrate and plug the interstitial flow passages in the remaining proppant filled fractures, which reduces or ceases fluid production. Similar high pressures can be generated within pipes having inner surfaces coated with traditional resins. Often, the traditional resin coating can be disintegrated by the relatively high internal pressure. As a result, the inner surface of the pipe can become exposed to the fluid or other mater passing therethrough that can eventually lead to erosion and rupture of the pipe.

There is a need, therefore, for an improved resin that has a greater cured strength than traditional resins and methods for making and using same.

SUMMARY

Treated aldehyde-based resins containing one or more polyamines and methods for making and same are provided. The treated aldehyde-based resin can be or include an aldehyde-based resin and a polyamine. The polyamine can be or include an aromatic polyamine, a poly($C_2$-$C_5$ alkylene) polyamine, or a mixture thereof. The treated aldehyde-based resin can include about 0.05 wt % to about 10 wt % of the polyamine, based on a solids weight of the aldehyde-based resin.

In some examples, the method for making the treated aldehyde-based resin can include combining one or more aldehyde-based resins and one or more polyamines to produce a mixture. The mixture can include about 0.05 wt % to about 10 wt % of the polyamine, based on a solids weight of the aldehyde-based resin. The mixture can be heated to a temperature of about 110° C. to about 200° C. to produce a treated aldehyde-based resin. The treated aldehyde-based resin can be cooled to a temperature of less than 50° C. In one example, the aldehyde-based resin can be or include one or more phenol-formaldehyde resins, one or more urea-formaldehyde resins, or any mixture thereof.

In other examples, the method for making the treated aldehyde-based resins can include combining formaldehyde and one or more reagents to produce a first mixture. The reagent can be or include phenol, urea, or a mixture thereof. The first mixture can be heated to produce the aldehyde-based resin. The aldehyde-based resin and the polyamine can be combined and can be agitated to produce a second mixture. The polyamine can be or include an aromatic polyamine, a poly($C_2$-$C_5$ alkylene) polyamine, or a mixture thereof. The second mixture can include about 0.05 wt % to about 10 wt % of the polyamine, based on a solids weight of the aldehyde-based resin. The second mixture can be heated to a temperature of about 110° C. to about 200° C. for about 5 minutes to about 90 minutes to produce the treated aldehyde-based resin. The treated aldehyde-based resin can be cooled to a temperature of less than 50° C. to solidify the treated aldehyde-based resin.

DETAILED DESCRIPTION

One or more aldehyde-based resins and one or more polyamines can be mixed, blended, combined, and/or reacted with one another to produce treated aldehyde-based resins containing the one or more polyamines. The polyamine can be or include one or more aromatic polyamines, one or more poly($C_2$-$C_5$ alkylene) polyamines, or any mixture thereof. The polyamine can be combined with the aldehyde-based resin in an amount of about 0.05 wt % to about 10 wt %, based on a solids weight of the aldehyde-based resin. A mixture of the aldehyde-based resin and the polyamine can be heated to a temperature of about 110° C. to about 200° C. for about 5 minutes to about 90 minutes or more to produce the treated aldehyde-based resin. In some examples, the treated aldehyde-based resin can be cooled to a temperature of less than 50° C. to solidify the treated aldehyde-based resin.

The treated aldehyde-based resin can have an increased cured strength and toughness compared to an untreated resin, i.e., the same aldehyde-based resin without the one or more polyamines mixed, blended, combined, and/or reacted therewith. The treated aldehyde-based resin can be made or otherwise produced by a variety of processes. The aldehyde-based resin and the polyamine, when added, mixed, or otherwise combined with one another to produce the treated aldehyde-based resin, can independently be in a solid state, a molten state, a liquid state (e.g., liquids, solutions, suspensions, emulsions, flocculations, or in one or multiple phases), or any combination thereof. In some examples, the polyamine in a solid state can be added to or combined with the aldehyde-based resin in a solid or molten state. In other examples, the polyamine in a liquid state can be added to or combined with the aldehyde-based resin in a molten or liquid state. In other examples, the polyamine in a solid or liquid state can be added to or combined with a reaction mixture that includes the aldehyde-based resin. In other examples, the polyamine in a solid or liquid state can be added to or combined with a mixture that includes the aldehyde-based resin in a solid or molten state and one or more other components, such as a plurality of particles or fibers.

In a first process, the polyamine can be added, mixed, or otherwise combined with a reaction mixture that includes the aldehyde-based resin. For example, the polyamine can be added to or combined with the reaction mixture of one or more reagents (e.g., phenol, urea, or a mixture thereof) and one or more aldehydes (e.g., formaldehyde) that have formed the aldehyde-based resin. The polyamine can further react with the aldehyde-based resin to produce the treated aldehyde-based resin. In a second process, the polyamine can be added, mixed, or otherwise combined with the aldehyde-based resin that is in a molten state. For example, the polyamine can be added to or combined with the molten aldehyde-based resin and the mixture can be agitated and cooled to produce the treated aldehyde-based resin. In a third process, the polyamine can be added, mixed, or otherwise combined with the aldehyde-based resin, one or more additional components, and optionally a cross-linker to make a product that contains the cured resin. For example, the polyamine can be added to or combined with a mixture that includes the aldehyde-based resin, and a plurality of particles for making coated proppants having the cured resin coating or a plurality of fibers for making a fibrous mat containing the cured resin therein. In some examples, the polyamine can be added to or combined with the aldehyde-based resin, the plurality of particles, and optionally a cross-linker to produce the plurality of coated proppants having the cured resin. In any of these processes, the aldehyde-based resin can be added, mixed, or otherwise combined with the polyamine.

In the first process for making treated resins, the polyamine can be added to or combined with a reaction mixture that includes the aldehyde-based resin. One or more aldehydes (e.g., formaldehyde) and one or more reagents (e.g., phenol, urea, or a mixture thereof) can be mixed or otherwise combined to produce a first mixture. For example, formaldehyde or other aldehyde can be added to or combined with phenol and/or urea and agitated to produce the first mixture. The first mixture can be heated to produce an aldehyde-based resin. For example, the first mixture can be heated to a temperature of about 35° C., about 40° C., about 50° C., or about 60° C. to about 65° C., about 70° C., about 75° C., about 80° C., about 85° C., about 90° C., about 95° C., about 100° C., or about 105° C. to produce the aldehyde-based resin. In another example, the first mixture can be heated to a temperature of about 35° C. to about 105° C., about 50° C. to about 100° C., about 60° C. to about 100° C., about 70° C. to about 100° C., about 50° C. to about 90° C., about 60° C. to about 90° C., about 70° C. to about 90° C., about 50° C. to about 90° C., about 60° C. to about 85° C., about 70° C. to about 85° C., or about 80° C. to about 85° C. to produce the aldehyde-based resin.

The first mixture can be heated for about 0.1 hr, about 0.5 hr, about 0.8 hr, about 1 hr, or about 1.5 hr to about 2 hr, about 2.5 hr, about 3 hr, about 4 hr, about 5 hr, or about 6 hr to produce the aldehyde-based resin. For example, the first mixture can be heated for about 0.1 hr to about 6 hr, about 0.5 hr to about 5 hr, about 1 hr to about 4 hr, about 1 hr to about 3 hr, or about 2 hr to about 3 hr to produce the aldehyde-based resin. The first mixture can be maintained under an inert atmosphere, such as an atmosphere containing one or more inert gases and/or under vacuum to produce the aldehyde-based resin. For example, one or more gases containing nitrogen ($N_2$), argon, or other inert gas sufficiently non-reactive to the first mixture can be flowed over and/or through the first mixture. In one specific example, the first mixture can be maintained under a nitrogen gas and heated to about 60° C. to about 100° C. or about 80° C. to about 90° C. for about 2 hr to about 3 hr to produce the aldehyde-based resin.

One or more polyamines and the aldehyde-based resin can be mixed or otherwise combined to produce a second mixture. For example, the polyamine can be added to or combined with the aldehyde-based resin and agitated to produce the second mixture. The second mixture can be heated to produce the treated aldehyde-based resin. For example, the second mixture can be heated to a temperature of about 100° C., about 110° C., or about 120° C. to about 125° C., about 130° C., about 140° C., about 150° C., about 160° C., about 170° C., about 180° C., about 190° C., about 200° C., about 210° C., about 220° C., or greater to produce the treated aldehyde-based resin. In another example, the second mixture can be heated to a temperature of about 100° C. to about 220° C., about 110° C. to about 220° C., about 110° C. to about 200° C., about 120° C. to about 200° C., about 120° C. to about 180° C., about 130° C. to about 180° C., about 140° C. to about 180° C., about 150° C. to about 180° C., about 155° C. to about 170° C., about 160° C. to about 180° C., about 170° C. to about 180° C., or about 160° C. to about 170° C. to produce the treated aldehyde-based resin.

The second mixture can be heated for about 1 min, about 5 min, about 10 min, or about 15 min to about 20 min, about 30 min, about 45 min, about 1 hr, about 1.5 hr, about 2 hr, or about 3 hr to produce the treated aldehyde-based resin. For example, the second mixture can be heated for about 1 min to about 3 hr, about 5 min to about 2 hr, about 5 min to about 1 hr, about 10 min to about 1 hr, about 10 min to about 45 min, about 10 min to about 30 min, about 20 min to about 1 hr, about 20 min to about 45 min, or about 20 min to about 30 min to produce the treated aldehyde-based resin.

The second mixture can be maintained under an inert atmosphere while heated to produce the treated aldehyde-based resin, such as an atmosphere containing one or more inert gases and/or under vacuum. For example, one or more gases containing nitrogen ($N_2$), argon, or other inert gas sufficiently non-reactive to the second mixture can be flowed over, through, and/or otherwise about the second mixture. In one specific example, the second mixture can be maintained under an atmosphere of nitrogen gas, e.g., at least 99 mol % nitrogen gas, and heated to a temperature of about 140° C. to about 180° C. or about 155° C. to about 170° C. for about 0.1 hr to about 1 hr or about 0.25 hr to about 0.75 hr to produce the treated aldehyde-based resin.

In some examples of the first process, the polyamine can be combined with the aldehyde-based resin in an amount of about 0.1 wt % to about 1.5 wt %, based on a solids weight of the aldehyde-based resin. For example, the polyamine can be combined with the aldehyde-based resin in an amount of about 0.05 wt % to about 2 wt %, about 0.1 wt % to about 1.5 wt %, about 0.15 wt % to about 1 wt %, about 0.2 wt % to about 0.8 wt %, about 0.2 wt % to about 0.6 wt %, about 0.2 wt % to about 0.4 wt %, about 0.4 wt % to about 0.8 wt %, or about 0.4 wt % to about 0.6 wt %, based on a solids weight of the aldehyde-based resin.

In the second process for making treated resins, one or more solid aldehyde-based resins can be used as starting materials. The one or more solid aldehyde-based resins can be heated to produce a molten aldehyde-based resin. The solid aldehyde-based resins can be heated to a temperature of about 100° C., about 105° C., about 110° C., or about 115° C. to about 120° C., about 125° C., about 130° C., about 135° C., about 137° C., about 139° C., about 140° C., about 150° C., about 160° C., about 170° C., about 180° C., about 190° C., about 200° C., or greater to produce the molten aldehyde-based resin. For example, the aldehyde-based resins can be heated to a temperature of about 100° C. to about 200° C., about 110° C. to about 200° C., about 105° C. to about 180° C., about 110° C. to about 180° C., about 110° C. to about 170° C., about 110° C. to about 160° C., about 110° C. to about 150° C., about 110° C. to about 145° C., about 110° C. to about 140° C., about 120° C. to about 180° C., about 120° C. to about 170° C., about 120° C. to about 160° C., about 120° C. to about 150° C., about 120° C. to about 145° C., about 120° C. to about 140° C., about 130° C. to about 180° C., about 130° C. to about 170° C., about 130° C. to about 160° C., about 130° C. to about 150° C., about 130° C. to about 145° C., about 130° C. to about 140° C., or about 135° C. to about 140° C. to produce the molten aldehyde-based resin.

The aldehyde-based resins can be heated for about 1 min, about 2 min, about 3 min, about 5 min, or about 8 min to about 10 min, about 15 min, about 20 min, about 30 min, about 40 min, about 50 min, about 1 hr, about 1.5 hr, or about 2 hr to produce the molten aldehyde-based resin. For example, the solid aldehyde-based resins can be heated for about 1 min to about 2 hr, about 2 min to about 1 hr, about 5 min to about 30 min, about 5 min to about 20 min, about 5 min to about 15 min, about 10 min to about 30 min, about 10 min to about 20 min, or about 10 min to about 15 min to produce the molten aldehyde-based resin.

The aldehyde-based resin can be maintained under an inert atmosphere while heated to produce the molten aldehyde-based resin, such as an atmosphere containing one or more inert gases and/or under vacuum. For example, one or more gases containing nitrogen ($N_2$), argon, or other inert gas sufficiently non-reactive to the solid or molten aldehyde-based resins can be flowed over and/or through the solid aldehyde-based resins. In one specific example, the solid aldehyde-based resins can be maintained under a nitrogen gas, e.g., at least 99 mol % nitrogen gas, and heated to a temperature of about 60° C. to about 100° C. or about 80° C. to about 85° C. for about 2 hr to about 3 hr to produce the molten aldehyde-based resin.

The one or more polyamines and the molten aldehyde-based resin can be mixed or otherwise combined to produce a molten mixture. For example, the polyamine can be added to or combined with the molten aldehyde-based resin and agitated to produce the molten mixture. Thereafter, the molten mixture can be heated for a period of time to produce the treated aldehyde-based resin. Subsequently, the treated aldehyde-based resin can be cooled to produce a solidified treated resin. In one example, the polyamine can be mixed with the aldehyde-based resin under the inert atmosphere. In another example, the polyamine can be mixed with the aldehyde-based resin in air.

The molten mixture can be heated to a temperature of about 100° C., about 105° C., about 110° C., or about 115° C. to about 120° C., about 125° C., about 130° C., about 135° C., about 137° C., about 139° C., about 140° C., about 150° C., about 160° C., about 170° C., about 180° C., about 190° C., about 200° C., or greater to produce the treated aldehyde-based resin. For example, the molten mixture can be heated to a temperature of about 100° C. to about 200° C., about 110° C. to about 200° C., about 105° C. to about 180° C., about 110° C. to about 180° C., about 110° C. to about 170° C., about 110° C. to about 160° C., about 110° C. to about 150° C., about 110° C. to about 145° C., about 110° C. to about 140° C., about 120° C. to about 180° C., about 120° C. to about 170° C., about 120° C. to about 160° C., about 120° C. to about 150° C., about 120° C. to about 145° C., about 120° C. to about 140° C., about 130° C. to about 180° C., about 130° C. to about 170° C., about 130° C. to about 160° C., about 130° C. to about 150° C., about 130° C. to about 145° C., about 130° C. to about 140° C., or about 135° C. to about 140° C., or about 135° C. to about 145° C. to produce the treated aldehyde-based resin.

The molten mixture can be heated for about 1 min, about 5 min, about 10 min, or about 15 min to about 20 min, about 30 min, about 45 min, about 1 hr, about 1.5 hr, about 2 hr, or about 3 hr to produce the treated aldehyde-based resin. For example, the molten mixture can be heated for about 1 min to about 3 hr, about 5 min to about 2 hr, about 5 min to about 1 hr, about 10 min to about 1 hr, about 10 min to about 45 min, about 10 min to about 30 min, about 20 min to about 1 hr, about 20 min to about 45 min, or about 20 min to about 30 min to produce the treated aldehyde-based resin.

In the second process, the polyamine can be combined with the aldehyde-based resin in an amount of about 1 wt %, about 2 wt %, about 3 wt %, or about 4 wt % to about 5 wt %, about 6 wt %, about 8 wt %, or about 10 wt %, based on a solids weight of the aldehyde-based resin. For example, in the second process, the polyamine can be combined with the aldehyde-based resin in an amount of about 1 wt % to about 10 wt %, about 1 wt % to about 8 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 8 wt %, about 2 wt % to about 6 wt %, about 2 wt % to about 5 wt %, about 2 wt % to about 4 wt %, about 2 wt % to about 3 wt %, about 3 wt % to about 8 wt %, about 3 wt % to about 6 wt %, about 3 wt % to about 5 wt %, or about 3 wt % to about 4 wt %, based on a solids weight of the aldehyde-based resin.

The molten aldehyde-based resin, the second mixture, or the molten mixture that can include the treated aldehyde-based resin can be cooled to a temperature sufficiently low enough to produce the solidified treated resin, such as a temperature of less than 50° C. or an ambient temperature (e.g., about 23° C.). The molten aldehyde-based resin, the second mixture, or the molten mixture can be cooled to about 20° C., about 22° C., about 23° C., about 24° C., or about 25° C. to about 26° C., about 28° C., about 30° C., about 35° C., about 40° C., about 45° C., or about 50° C. to produce the solidified treated resin. In some examples, the molten aldehyde-based resin, the second mixture, or the molten mixture can be cooled to about 20° C., about 22° C., about 23° C., about 24° C., or about 25° C. to less than 28° C., less than 30° C., less than 35° C., less than 40° C., less than 45° C., or less than 50° C. to produce the solidified treated resin. For example, the molten aldehyde-based resin, the second mixture, or the molten mixture can be cooled to about 20° C. to about 30° C., about 22° C. to about 27° C., or about 23° C. to about 25° C. to produce the solidified treated resin.

The treated aldehyde-based resin made by the first, second, or third processes, or any other processes described herein, can include a varied amount of the polyamine. The treated aldehyde-based resin can include the polyamine in an amount of about 0.05 wt %, about 0.1 wt %, or about 0.15 wt % to about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2 wt %, about 2.5 wt %, about 3 wt %, about 3.5 wt %, about 4 wt %, about 4.5 wt %, about 5 wt %, about 6 wt %, about 7 wt %, about 8 wt %, about 9 wt %, about 10 wt %, or greater, based on a solids weight of the aldehyde-based resin. For example, the treated aldehyde-based resin can include the polyamine in an amount of about 0.05 wt % to about 10 wt %, about 0.05 wt % to about 2 wt %, about 0.1 wt % to about 1.5 wt %, about 0.15 wt % to about 1 wt %, about 0.2 wt % to about 0.8 wt %, about 0.2 wt % to about 0.6 wt %, about 0.2 wt % to about 0.4 wt %, about 0.4 wt % to about 0.8 wt %, or about 0.4 wt % to about 0.6 wt %, based on a solids weight of the aldehyde-based resin. In other examples, the treated aldehyde-based resin can include the polyamine in an amount of about 0.1 wt % to about 10 wt %, about 0.5 wt % to about 10 wt %, about 1 wt % to about 10 wt %, about 1 wt % to about 8 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 8 wt %, about 2 wt % to about 6 wt %, about 2 wt % to about 5 wt %, about 2 wt % to about 4 wt %, about 2 wt % to about 3 wt %, about 3 wt % to about 8 wt %, about 3 wt % to about 6 wt %, about 3 wt % to about 5 wt %, or about 3 wt % to about 4 wt %, based on a solids weight of the aldehyde-based resin.

The polyamine can be or include one or more aromatic diamines, one or more aromatic triamines, one or more cycloaliphatic diamines, one or more cycloaliphatic triamines, one or more dialkylenetriamines, one or more trialkylenetetraamines, or any mixture thereof. Illustrative aromatic diamines can be or include, but are not limited to, 1,2-diaminobenzene (also known as o-diaminobenzene (o-DAB) or o-phenylenediamine (OPD)); 1,3-diaminobenzene (also known as m-diaminobenzene (m-DAB) or m-phenylenediamine (MPD)); 1,4-diaminobenzene (also known as p-diaminobenzene (p-DAB) or p-phenylenediamine (PPD)); 2,4'-diaminodiphenyl ether (2,4'-ODA); 3,4'-diaminodiphenyl ether (3,4'-ODA); 4,4'-diaminodiphenyl ether (4,4'-ODA); 1,2-xylylenediamine (also known as o-xylylenediamine (OXDA)); 1,3-xylylenediamine (also known as m-xylylenediamine (MXDA)); 1,4-xylylenediamine (also known as p-xylylenediamine (PXDA)); isomers thereof; salts thereof; complexes thereof; adducts thereof; or any mixture thereof. Illustrative cycloaliphatic diamines can be or include, but are not limited to, isophoronediamine (also known as 5-amino-(1-aminomethyl)-1,3,3-trimethylcyclohexane); 1,3-cyclohexanebis(methylamine) (1,3-BAMC); 1,4-cyclohexanebis(methylamine) (1,4-BAMC); 4,4-diaminodicyclohexylmethane (PACM); bis(4-amino-3-methylcyclohexyl)methane; isomers thereof; salts thereof; complexes thereof; adducts thereof; or any mixture thereof.

The polyamine can be or include one or more poly($C_2$-$C_5$ alkylene) polyamines that can include, but are not limited to dialkylenetriamines, trialkylenetetraamines, tetraalkylenepentaamines, or other polyalkylene polyamines. Illustrative poly($C_2$-$C_5$ alkylene) polyamines that are dialkylenetriamines can be or include diethylenetriamine (DETA), dipropylenetriamine, dibutylenetriamine, an isomer thereof, a salt thereof, a complex thereof, an adduct thereof, or any mixture thereof. Other illustrative poly($C_2$-$C_5$ alkylene) polyamines can be or include, but are not limited to, triethylenetetramine (TETA), tetraethylenepentamine (TEPA), pentaethylenehexamine (PEHA), dipropylenetriamine, tripropylenetetramine, tetrapropylenepentamine, pentapropylenehexamine, dibutylenetriamine, tributylenetetramine, tetrabutylenepentamine, pentabutylenehexamine, aminoethylpiperazine, dipropylenetriamine, an isomer thereof, a salt thereof, a complex thereof, an adduct thereof, or any mixture thereof. In some specific examples, the polyamine can be or include one or more dimethylenetriamine, trimethylenetetramine, tetramethylenepentamine, or pentamethylenehexamine.

In some examples, the aldehyde-based resin is a phenol-formaldehyde resin and the phenol-formaldehyde resins can be produced by adding to a reactor containing phenol, an amount of formaldehyde sufficient to establish an initial formaldehyde to phenol (F:P) molar ratio of about 0.6:1 to about 5:1. Phenol-formaldehyde novolac resins can generally have an F:P molar ratio of less than about 1:1 or less than about 0.8:1. Phenolic novolac resins that have a molar deficiency of formaldehyde relative to phenol are generally thermoplastic materials that do not cure in the absence of a cross-linker. Phenol-formaldehyde resole resins can generally have an F:P molar ratio of about 1:1 or greater. In some examples, the phenol-formaldehyde resins can have an F:P molar ratio of about 0.6:1 to about 1:1, about 0.6:1 to less than 1:1, about 0.6:1 to about 0.8:1, about 0.6:1 to less than 0.8:1, about 0.6:1 to about 0.9:1, about 0.6:1 to less than 0.9:1, about 0.6:1 to less than 0.95:1, or about 0.6:1 to less than 1:1. In other examples, the phenol-formaldehyde resins can have an F:P molar ratio of about 1:1 to about 2.65:1, about 1:1 to about 2.5:1, about 1:1 to about 2:1, about 1:1 to about 3:1, about 1:1 to about 4:1, about 1:1 to about 5:1, or about 1:1 to about 6:1. In one or more examples, the aldehyde-based resin can be or include one or more phenol-formaldehyde novolac resins, one or more copolymers thereof, or a mixture thereof.

Illustrative aldehyde-based resins can be or include, but are not limited to, one or more urea-formaldehyde (UF) resins, one or more phenol-formaldehyde (PF) resins, one or more melamine-formaldehyde (MF) resins, one or more resorcinol-formaldehyde (RF) resins, melamine-urea-formaldehyde (MUF) resins, phenol-urea-formaldehyde (PUF) resins, phenol-melamine-formaldehyde (PMF) resins, phenol-resorcinol-formaldehyde (PRF) resins, copolymers thereof, salts thereof, derivatives thereof, or any mixture thereof. In some examples, the aldehyde-based resins can be or include a copolymer produced from styrene-acrylic acid, acrylic acid, maleic acid, or any mixture thereof. For example, the aldehyde-based resins can be or include a combination of an amino-aldehyde copolymer and/or a phenol-aldehyde copolymer and a polyacrylic acid, for example, urea-formaldehyde-polyacrylic acid, melamine-formaldehyde-poly acrylic acid, phenol-formaldehyde-polyacrylic acid, or any mixture thereof.

The treated aldehyde-based resin can also include one or more additives in addition to the aldehyde-based resin and the polyamine. Illustrative additives can be or include, but are not limited to, one or more dibasic esters, one or more waxes, one or more aminosilanes, one or more organic acids, one or more solvents, one or more pH adjusting agents, or any mixture thereof.

The treated aldehyde-based resin can include one or more dibasic esters. The dibasic ester can be or include one or more compounds that have the chemical formula $CH_3O_2C(CH_2)_nCO_2CH_3$, where n can be 1, 2, 3, 4, or 5. For example, the dibasic ester can be or include dibasic ester-2 (also known as DBE-2), where n can be 3 or 4, such as dimethyl glutarate, dimethyl adipate, or a mixture of dimethyl glutarate and dimethyl adipate. In some examples, the dibasic ester can be or include dibasic ester-9 (also known as DBE-9), where n can be 2 or 3, such as dimethyl glutarate, dimethyl succinate, or a mixture of dimethyl glutarate and dimethyl succinate. In other examples, the dibasic ester can be or include dibasic ester-4 (also known as DBE-4), where n can be 2, such as dimethyl succinate. In other examples, the dibasic ester can be or include dibasic ester-5 (also known as DBE-5), where n can be 3, such as dimethyl glutarate. In other examples, the dibasic ester can be or include dibasic ester-6 (also known as DBE-6), where n can be 4, such as dimethyl adipate. Illustrative dibasic esters can be or include, but are not limited to, one or more of dimethyl glutarate, dimethyl adipate, dimethyl succinate, or any mixture thereof.

The treated aldehyde-based resin can include the dibasic ester in an amount of about 0.1 wt %, about 0.2 wt %, about 0.3 wt %, or about 0.5 wt % to about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.7 wt %, about 1.9 wt %, about 2 wt %, about 2.1 wt %, about 2.3 wt %, about 2.5 wt %, about 2.7 wt %, about 2.9 wt %, about 3 wt %, about 3.1 wt %, about 3.3 wt %, about 3.5 wt %, about 3.7 wt %, about 3.9 wt %, about 4 wt %, about 4.5 wt %, about 5 wt %, or greater, based on a solids weight of the aldehyde-based resin. For example, the treated aldehyde-based resin can include the dibasic ester in an amount of about 0.1 wt % to about 5 wt %, about 0.2 wt % to about 4 wt %, about 0.2 wt % to about 2 wt %, about 0.2 wt % to about 1.5 wt %, about 0.5 wt % to about 5 wt %, about 0.5 wt % to about 4 wt %, about 0.5 wt % to about 3 wt %, about 0.5 wt % to about 2 wt %, about 0.5 wt % to about 1.5 wt %, about 1 wt % to about 4 wt %, about 1 wt % to about 3 wt %, about 1 wt % to about 2 wt %, or about 1 wt % to about 1.5 wt %, based on a solids weight of the aldehyde-based resin.

The treated aldehyde-based resin can include one or more aminosilanes, such as, but not limited to 3-aminopropyltrimethoxysilane, 3-aminopropyltriethoxysilane, N-(beta-aminoethyl) gamma-aminopropyltrimethoxysilane, N-(beta-aminoethyl) gamma-aminopropyltriethoxysilane, 3-glycidoxypropyltrimethoxysilane, 3-glycidoxypropyltriethoxysilane, isomers thereof, salts thereof, or any mixture thereof. The treated aldehyde-based resin can include the aminosilane in an amount of about 0.01 wt %, about 0.02 wt %, about 0.03 wt %, or about 0.05 wt % to about 0.06 wt %, about 0.08 wt %, about 0.1 wt %, about 0.11 wt %, about 0.13 wt %, about 0.15 wt %, about 0.17 wt %, about 0.19 wt %, about 0.2 wt %, about 0.21 wt %, about 0.23 wt %, about 0.25 wt %, about 0.27 wt %, about 0.3 wt %, about 0.31 wt %, about 0.33 wt %, about 0.35 wt %, about 0.37 wt %, about 0.4 wt %, about 0.41 wt %, about 0.43 wt %, about 0.45 wt %, about 0.47 wt %, about 0.5 wt %, about 0.55 wt %, about 0.6 wt %, about 0.7 wt %, about 0.8 wt %, about 0.9 wt %, about 1 wt %, about 1.5 wt %, about 2 wt %, about 2.5 wt %, about 3 wt %, or greater, based on a solids weight of the aldehyde-based resin. For example, the treated aldehyde-based resin can include the aminosilane in an amount of about 0.01 wt % to about 3 wt %, about 0.02 wt % to about 2 wt %, about 0.02 wt % to about 1 wt %, about 0.05 wt % to about 1.5 wt %, about 0.05 wt % to about 1 wt %, about 0.05 wt % to about 0.7 wt %, about 0.05 wt % to about 0.5 wt %, about 0.1 wt % to about 1.5 wt %, about 0.1 wt % to about 1 wt %, about 0.1 wt % to about 0.7 wt %, about 0.1 wt % to about 0.5 wt %, about 0.2 wt % to about 1.5 wt %, about 0.2 wt % to about 1 wt %, about 0.2 wt % to about 0.7 wt %, or about 0.2 wt % to about 0.5 wt %, based on a solids weight of the aldehyde-based resin.

The treated aldehyde-based resin can include one or more waxes, such as, synthetic wax, natural wax, or a mixture thereof. Illustrative waxes can be or include, but are not limited to, paraffin waxes, polyethylene waxes, N,N'-ethylenebis(stearamide) waxes, metallic stearate waxes (e.g., calcium stearate, zinc stearate, lithium stearate), isomers thereof, salts thereof, or any mixture thereof. Illustrative metallic stearate waxes can be or include, but are not limited to, calcium stearate, zinc stearate, aluminum stearate, magnesium stearate, lithium stearate, sodium stearate, potassium stearate, isomers thereof, salts thereof, or any mixture thereof. One illustrative synthetic wax can be or include N,N'-ethylenebis(stearamide), commercially available as ACRAWAX C® wax. In some examples, the treated aldehyde-based resin can include synthetic wax beads. The treated aldehyde-based resin can include the wax in an amount of about 0.1 wt %, about 0.2 wt %, about 0.3 wt %, or about 0.5 wt % to about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.7 wt %, about 1.9 wt %, about 2 wt %, about 2.1 wt %, about 2.3 wt %, about 2.5 wt %, about 2.7 wt %, about 2.9 wt %, about 3 wt %, about 3.1 wt %, about 3.3 wt %, about 3.5 wt %, about 3.7 wt %, about 3.9 wt %, about 4 wt %, about 4.5 wt %, about 5 wt %, or greater, based on a solids weight of the aldehyde-based resin. For example, the treated aldehyde-based resin can include the wax in an amount of about 0.1 wt % to about 5 wt %, about 0.2 wt % to about 4 wt %, about 0.2 wt % to about 2 wt %, about 0.2 wt % to about 1.5 wt %, about 0.5 wt % to about 5 wt %, about 0.5 wt % to about 4 wt %, about 0.5 wt % to about 3 wt %, about 0.5 wt % to about 2 wt %, about 0.5 wt % to about 1.5 wt %, about 1 wt % to about 4 wt %, about 1 wt % to about 3 wt %, about 1 wt % to about 2 wt %, or about 1 wt % to about 1.5 wt %, based on a solids weight of the aldehyde-based resin.

The treated aldehyde-based resin can include one or more organic acids that can be or include, but are not limited to, salicylic acid, benzoic acid, maleic acid, citric acid, succinic acid, oxalic acid, isomers thereof, salts thereof, hydrates thereof, or any mixture thereof. The treated aldehyde-based resin can include organic acid in an amount of about 0.05 wt %, about 0.07 wt %, about 0.09 wt %, or about 0.1 wt % to about 0.15 wt %, about 0.2 wt %, about 0.25 wt %, about 0.3 wt %, about 0.35 wt %, about 0.4 wt %, about 0.45 wt %, about 0.5 wt %, about 0.55 wt %, about 0.6 wt %, about 0.65 wt %, about 0.7 wt %, about 0.75 wt %, about 0.8 wt %, about 0.85 wt %, about 0.9 wt %, about 0.95 wt %, about 1 wt %, about 1.2 wt %, about 1.5 wt %, about 1.7 wt %, about 2 wt %, about 2.5 wt %, about 3 wt %, or greater, based on a solids weight of the aldehyde-based resin. For example, the treated aldehyde-based resin can include organic acid in an amount of about 0.05 wt % to about 3 wt %, about 0.07 wt % to about 2 wt %, about 0.1 wt % to about 3 wt %, about 0.1 wt % to about 2 wt %, about 0.1 wt % to about 1 wt %, about 0.2 wt % to about 3 wt %, about 0.2 wt % to about 2 wt %, about 0.2 wt % to about 1 wt %, about 0.4 wt % to about 3 wt %, about 0.4 wt % to about 2 wt %, or about 0.4 wt % to about 1 wt %, based on a solids weight of the aldehyde-based resin.

The treated aldehyde-based resin can include one or more pH adjusting agents, such as, one or more acids or one or more bases. Illustrative acids can be or include, but are not limited to, sulfuric acid, phosphoric acid, hydrochloric acid, salts thereof, or any mixture thereof. Illustrative bases can be or include, but are not limited to, ammonium hydroxide, lithium hydroxide, sodium hydroxide, potassium hydroxide, urea, urea compounds, amines, salts thereof, or any mixture thereof. In some examples, the treated aldehyde-based resin can include sulfuric acid and ammonium hydroxide. The treated aldehyde-based resin can include the pH adjusting agent in an amount of about 0.01 wt %, about 0.02 wt %, about 0.03 wt %, or about 0.05 wt % to about 0.06 wt %, about 0.08 wt %, about 0.1 wt %, about 0.11 wt %, about 0.13 wt %, about 0.15 wt %, about 0.17 wt %, about 0.19 wt %, about 0.2 wt %, about 0.21 wt %, about 0.23 wt %, about 0.25 wt %, about 0.27 wt %, about 0.3 wt %, about 0.31 wt %, about 0.33 wt %, about 0.35 wt %, about 0.37 wt %, about 0.4 wt %, about 0.41 wt %, about 0.43 wt %, about 0.45 wt %, about 0.47 wt %, about 0.5 wt %, about 0.55 wt %, about 0.6 wt %, about 0.7 wt %, about 0.8 wt %, about 0.9 wt %, about 1 wt %, about 1.5 wt %, about 2 wt %, about 2.5 wt %, about 3 wt %, or greater, based on a solids weight of the aldehyde-based resin. For example, the treated aldehyde-based resin can include the pH adjusting agent in an amount of about 0.01 wt % to about 3 wt %, about 0.02 wt % to about 2 wt %, about 0.02 wt % to about 1 wt %, about 0.05 wt % to about 1.5 wt %, about 0.05 wt % to about 1 wt %, about 0.05 wt % to about 0.7 wt %, about 0.05 wt % to about 0.5 wt %, about 0.1 wt % to about 1.5 wt %, about 0.1 wt % to about 1 wt %, about 0.1 wt % to about 0.7 wt %, about 0.1 wt % to about 0.5 wt %, about 0.2 wt % to about 1.5 wt %, about 0.2 wt % to about 1 wt %, about 0.2 wt % to about 0.7 wt %, or about 0.2 wt % to about 0.5 wt %, based on a solids weight of the aldehyde-based resin. In some examples, the pH adjusting agent can be or include sulfuric acid in an amount of about 0.05 wt % to about 0.4 wt % and ammonium hydroxide in an amount of about 0.1 wt % to about 1 wt %.

The treated aldehyde-based resin can include one or more solvents, such as, but not limited to water, one or more organic solvents (e.g., ethers, alkanes, alcohols, and/or aromatics), or any mixture thereof. In some examples, the treated aldehyde-based resin can include water. The treated aldehyde-based resin can include water or a solvent in an amount of about 0.01 wt %, about 0.02 wt %, about 0.03 wt %, or about 0.05 wt % to about 0.06 wt %, about 0.08 wt %, about 0.1 wt %, about 0.11 wt %, about 0.13 wt %, about 0.15 wt %, about 0.17 wt %, about 0.19 wt %, about 0.2 wt %, about 0.21 wt %, about 0.23 wt %, about 0.25 wt %, about 0.27 wt %, about 0.3 wt %, about 0.31 wt %, about 0.33 wt %, about 0.35 wt %, about 0.37 wt %, about 0.4 wt %, about 0.41 wt %, about 0.43 wt %, about 0.45 wt %, about 0.47 wt %, about 0.5 wt %, about 0.55 wt %, about 0.6 wt %, about 0.7 wt %, about 0.8 wt %, about 0.9 wt %, about 1 wt %, about 1.5 wt %, about 2 wt %, about 2.5 wt %, about 3 wt %, or greater, based on a solids weight of the aldehyde-based resin. For example, the treated aldehyde-based resin can include water or a solvent in an amount of about 0.01 wt % to about 3 wt %, about 0.02 wt % to about 2 wt %, about 0.02 wt % to about 1 wt %, about 0.05 wt % to about 1.5 wt %, about 0.05 wt % to about 1 wt %, about 0.05 wt % to about 0.7 wt %, about 0.05 wt % to about 0.5 wt %, about 0.1 wt % to about 1.5 wt %, about 0.1 wt % to about 1 wt %, about 0.1 wt % to about 0.7 wt %, about 0.1 wt % to about 0.5 wt %, about 0.2 wt % to about 1.5 wt %, about 0.2 wt % to about 1 wt %, about 0.2 wt % to about 0.7 wt %, or about 0.2 wt % to about 0.5 wt %, based on a solids weight of the aldehyde-based resin.

The treated aldehyde-based resin can have a number average molecular weight ($M_n$) of about 500, about 1,000, about 1,500, or about 2,000 to about 2,500, about 3,000, about 3,500, about 4,000, about 4,500, about 5,000, about 6,000, about 7,000, about 8,000, about 9,000, about 10,000, or greater. For example, the $M_n$ of the treated aldehyde-based resin can be about 500 to about 10,000, about 1,000 to about 8,000, about 1,500 to about 6,000, about 1,500 to about 5,500, about 1,500 to about 5,000, about 1,500 to about 4,500, about 1,500 to about 4,000, about 1,500 to about 3,500, about 1,500 to about 3,000, about 1,500 to about 2,500, about 2,000 to about 6,000, about 2,000 to about 5,500, about 2,000 to about 5,000, about 2,000 to about 4,500, about 2,000 to about 4,000, about 2,000 to about 3,500, about 2,000 to about 3,000, about 2,000 to about 2,500. In some examples, the $M_n$ of the treated aldehyde-based resin can be about 2,000 to about 5,500 or about 2,500 to about 5,000.

The treated aldehyde-based resin can have a weight average molecular weight ($M_w$) of about 300, about 400, about 500, or about 600 to about 700, about 750, about 800, about 850, about 900, about 950, about 1,000, about 1,200, about 1,500, about 1,800, about 2,000, about 3,000, about 4,000, or greater. For example, the $M_w$ of the treated aldehyde-based resin can be about 300 to about 4,000, about 500 to about 3,000, about 500 to about 2,000, about 600 to about 3,000, about 600 to about 2,000, about 600 to about 1,000, about 600 to about 900, about 700 to about 900, about 750 to about 900, or about 800 to about 900. In some examples, the $M_w$ of the treated aldehyde-based resin can be about 500 to about 1,000, about 750 to about 900, or about 800 to about 900.

The treated aldehyde-based resin can have a z-average molecular weight ($M_z$) of about 1,000, about 2,000, about 3,000, about 4,000, or about 5,000 to about 6,000, about 6,500, about 7,000, about 7,500, about 8,000, about 8,500, about 9,000, about 9,500, about 10,000, about 15,000, about 20,000, about 30,000, about 50,000, about 70,000, about 80,000, about 100,000, or greater. For example, the $M_z$ of the treated aldehyde-based resin can be about 500 to about 80,000, about 1,000 to about 15,000, about 3,000 to about 15,000, about 5,000 to about 15,000, about 6,000 to about 15,000, about 7,000 to about 15,000, about 1,000 to about 10,000, about 3,000 to about 10,000, about 5,000 to about 10,000, about 6,000 to about 10,000, about 7,000 to about 10,000, about 1,000 to about 8,500, about 3,000 to about 8,500, about 5,000 to about 8,500, about 6,000 to about 8,500, about 6,000 to about 8,000, about 6,000 to about 7,500, or about 7,000 to about 7,500. In some specific examples, the $M_z$ of the treated aldehyde-based resin can be about 5,000 to about 9,000 or about 6,000 to about 8,000. In other examples, the $M_z$ of the treated aldehyde-based resin can be about 5,000 to about 100,000, about 10,000 to about 100,000, about 20,000 to about 100,000, about 40,000 to about 100,000, about 50,000 to about 100,000, about 60,000 to about 100,000, about 70,000 to about 100,000, about 10,000 to about 85,000, about 20,000 to about 85,000, about 40,000 to about 85,000, about 50,000 to about 85,000, about 60,000 to about 85,000, about 70,000 to about 85,000, or about 70,000 to about 80,000. In some specific examples, the $M_z$ of the treated aldehyde-based resin can be about 50,000 to about 100,000 or about 60,000 to about 85,000.

The number average molecular weight ($M_n$), the weight average molecular weight ($M_w$), and the z-average molecular weight ($M_z$) can be determined for the resins and/or polymers discussed and described herein. The $M_n$ is the arithmetic mean or average of the molecular masses or weights of the individual macromolecules of the polymer or resin. The $M_w$ is also the arithmetic mean or average of the molecular masses or weights of the individual macromolecules of the polymer or resin, but takes into account the molecular mass or weight of a chain in determining contributions to the molecular weight average. The $M_z$ is the third moment or third power average molar mass or weight. The $M_n$, the $M_w$, and the $M_z$ can be measured using gel permeation chromatography (GPC), also known as size exclusion chromatography (SEC). This technique utilizes an instrument containing columns packed with porous beads, an elution solvent, and detector in order to separate polymer molecules of different sizes, and is well known to those skilled in the art.

The treated aldehyde-based resins can have increased cured strength and toughness compared to the aldehyde-based resin prior to being treated with one or more polyamines. The treated aldehyde-based resin can be used as a coating. For example, the treated aldehyde-based resin can be used to at least partially coat a pipe or other conduit, or to at least partially coat a plurality of particles, e.g., to make a coated proppant. The treated aldehyde-based resin can be used to at least partially coat sand or other particles in foundry applications. The treated aldehyde-based resin can be used to make one or more laminates, glass or fibrous mats, and other materials. In some examples, the treated aldehyde-based resin can be or include a novolac resin that can be combined with a cross-linker. For example, the treated aldehyde-based resin can be or include one or more treated phenol-formaldehyde novolac resins, one or more copolymers thereof, or a mixture thereof. The treated aldehyde-based resin can be combined with a plurality of particles and one or more cross-linkers to produce a plurality of coated proppants that can have a cured resin coating at least partially encasing or coating each of the particles. It has been surprisingly and unexpectedly discovered that the coated proppants can have a dry crush strength of about 0.1 wt % to about 3 wt % or about 0.2 wt % to about 2.5 wt % at a pressure of about 55.2 MPa (about 8,000 psi), as measured according to the Proppant Crush Resistance Test Procedure under ISO 13503-2:2011.

In some examples, the treated aldehyde-based resins having an increased cured strength relative to untreated resins can be used to coat proppants. The coated proppants having the cured resin coating can have a dry crush strength of about 0.1 wt % to about 3 wt % at a pressure of about 55.2 MPa. The high strength coated proppants can be utilized to hold open formation fractures formed during a hydraulic fracturing process. In some examples, each coated proppant can have a single particle contained therein. Alternatively, in other examples, each coated proppant can have two or more particles contained therein. The particles can be or include, but are not limited to, sand, powders, gravel, beads, pellets, nut or seed media, mineral fibers, natural fibers, synthetic fibers, ceramics, or any mixture thereof. Illustrative sands that can be utilized as particles can be or include, but are not limited to, one or more frac sand, silica sand, glass (e.g., crushed or powdered glass), quartz, silicon dioxide, silica, silicates, other silicon oxide sources, or any mixture thereof. The type of sand used as the particles can have a variety of shapes and sizes. The sand may be relatively rounded or have spherical or substantially spherical grains or the sand may be an angular sand having sharp or less rounded grains. Similarly, particulates other than sand, such as ceramics, may be spherical or substantially spherical with rounded edges or angular with sharp or jagged edges.

Illustrative beads and pellets that can be utilized as particles can be or include, but are not limited to, one or more metals (e.g., aluminum, iron, steel, or alloys thereof), glass, sintered bauxite, ceramics (e.g., aluminum, zirconium, hafnium, and/or titanium oxide sources), mineral particulates, synthetic polymers or resins (e.g., nylon, polyethylene, or polypropylene), or any mixture thereof. In some examples, the particles can be or include rigid, substantially spherical pellets or spherical glass beads, such as UCAR® props, commercially available from Union Carbide Corporation. In some examples, the particles can be or include metallic beads and/or metallic pellets that contain one or more metals, such as, but not limited to, aluminum, iron, steel, magnesium, tin, bismuth, antimony, alloys thereof, or any mixture thereof. In other examples, the particles can be or include ceramic pellets that contain one or more ceramic materials.

The particles can include, but are not limited to, one or more silicon oxide sources (e.g., silica, silicates, silicon dioxide, or other silicon oxides), aluminum oxide sources (e.g., alumina, aluminates, or other aluminum oxides), zirconium oxide sources (e.g., zirconia, zirconium dioxide, or other zirconium oxides), hafnium oxide sources (e.g., hafnia, hafnium dioxide, or other hafnium oxides), titanium oxide sources (e.g., titania, titanium dioxide, or other titanium oxides), carbonate sources, other ceramic materials, other metal oxides, or any mixture thereof.

Nut or seed media can be, include, and/or be produced from, but are not limited to, nuts, nut shells, pits, seeds, and/or seed hulls, including tree nuts, fruit pits, and oil seeds. The nuts and/or seeds can be whole, broken, chopped, crushed, milled, ground, powdered, or otherwise processed or size-reduced, or any mixture thereof. Illustrative nuts or seeds can include, but are not limited to, almond, walnut, pecan, chestnut, hickory, cashew, peanut, macadamia, sunflower, linseed, rapeseed, castor seed, poppy seed, hemp seed, tallow tree seed, safflower seed, mustard seed, olive pits, other tree nuts, other oilseeds, portions thereof, or any mixture thereof and can be used in or to produce the nut or seed media.

In some examples, the uncoated proppant can have a mesh size (or equivalent value of average particle size in parenthesis) of about 270 (about 53 µm), about 230 (about 63 µm), about 200 (about 75 µm), about 120 (about 125 µm), or about 100 (about 150 µm) to about 80 (about 180 µm), about 60 (about 250 µm), about 40 (about 425 µm), about 30 (about 600 µm), about 20 (about 850 µm), or about 10 (about 2 mm). For example, the uncoated proppant can have a mesh size (or equivalent average particle size) of about 270 (about 53 µm) to about 10 (about 2 mm), about 230 (about 63 µm) to about 10 (about 2 mm), about 200 (about 75 µm) to about 10 (about 2 mm), about 200 (about 75 µm) to about 20 (about 850 µm), about 100 (about 150 µm) to about 10 (about 2 mm), or about 100 (about 150 µm) to about 20 (about 850 µm). In other examples, the uncoated proppant can have a mesh size (or equivalent average particle size) of about 120 (about 125 µm), about 100 (about 150 µm), about 80 (about 180 µm), about 60 (about 250 µm), or about 40 (about 425 µm) to about 30 (about 600 µm), about 20 (about 850 µm), or about 10 (about 2 mm). For example, the uncoated proppant can have a mesh size (or equivalent average particle size) of about 80 (about 180 µm) to about 40 (about 425 µm), about 80 (about 180 µm) to about 20 (about 850 µm), about 80 (about 180 µm) to about 10 (about 2 mm), about 60 (about 250 µm) to about 40 (about 425 µm), about 60 (about 250 µm) to about 20 (about 850 µm), about 60 (about 250 µm) to about 10 (about 2 mm), about 40 (about 425 µm) to about 30 (about 600 µm), about 40 (about 425 µm) to about 20 (about 850 µm), or about 40 (about 425 µm) to about 10 (about 2 mm).

In some specific examples, the uncoated particles can be silica sand or frac sand and can have a mesh size (or equivalent average particle size) of about 40 (about 425 µm) or about 20 (about 850 µm) to about 10 (about 2 mm). In other specific examples, the uncoated particles can be gravel, beads, or pellets and can have a mesh size (or equivalent average particle size) of about 200 (about 75 µm) to about 10 (about 2 mm). The mesh size of the particles or proppants described and discussed herein can be measured according to the U.S. Standard Sieve Series and the average particle size of the particles or proppants described and discussed herein can be calculated from the measured mesh size. Further description for measuring and calculating mesh size and average particle size can be found in Measurement of Properties of Proppants Used in Hydraulic Fracturing and Gravel-Packing Operations, ANSI/API Recommended Practice 19C, May 2008, (ISO 13503-2:2006).

In some examples, a method for producing the coated proppant having the cured resin coating at least partially encasing or coating each of the uncoated particles is provided. The cured resin coating can include the treated aldehyde-based resin (e.g., one or more aldehyde-based resins and one or more polyamines) and one or more cross-linkers (e.g., hexamethylenetetramine). A plurality of particles (e.g., sand), the treated aldehyde-based resin, and the cross-linker can be combined in a blender, mixer, or other device to produce the coated proppant. In some examples, the particles can be heated to a temperature of about 50° C. to about 300° C. and combined with the treated aldehyde-based resin in the mixer and mixed for about 0.1 min to about 5 min. Thereafter, the cross-linker can be added to or combined with the mixture and mixed for about 1 min to about 10 min to produce coated proppants. The coated proppants can be removed from the mixer and allowed to cool to ambient temperature (e.g., about 23° C.) to produce the coated proppant having the cured resin coating at least partially encasing or coating each of the particles.

In some examples, the uncoated particles can be heated to a temperature of about 50° C., about 80° C., about 100° C., or about 120° C. to about 150° C., about 180° C., about 200° C., about 250° C., or about 300° C. when contacted with the treated aldehyde-based resin and/or the cross-linker. For example, the particles can be heated to a temperature about 50° C. to about 300° C., about 50° C. to about 200° C., about 50° C. to about 150° C., about 50° C. to about 100° C., or about 100° C. to about 200° C. when contacted with the treated aldehyde-based resin and/or the cross-linker.

The particles and the treated aldehyde-based resin can be mixed for about 0.1 min, about 0.2 min, about 0.3 min, or about 0.4 min to about 0.6 min, about 0.7 min, about 0.8 min, about 0.9 min, or about 1 min to about 2 min, about 3 min, about 4 min, or about 5 min. For example, the particles and the treated aldehyde-based resin can be mixed for about 0.1 min to about 5 min, about 0.2 min to about 3 min, about 0.3 min to about 1 min, about 0.2 min to about 0.8 min, or about 0.4 min to about 0.6 min. The particles, the treated aldehyde-based resin, and the cross-linker can be mixed for about 1 min, about 1.5 min, or about 2 min to about 3 min, about 5 min, about 7 min, or about 10 min. For example, the particles, the treated aldehyde-based resin, and the cross-linker can be mixed for about 1 min to about 10 min, about 1 min to about 5 min, about 1 min to about 3 min, or about 1 min to about 2 min. Additional details related to methods for producing coated proppants can include those discussed and described in U.S. Pat. Nos. 8,003,214; 8,133,587; and 8,778,495.

The cured resin coating can at least partially encase or completely encase the one or more particles. The cured resin coating containing one or more aldehyde-based resins and one or more polyamines provides the coated proppant with a dry crush strength of a surprisingly and unexpectedly discovered value in comparison to traditional proppants. Without wishing to be bound by theory, it is believed that the polyamines having additional amino groups can provide extra points for hydrogen bonding between the polymer/resin chains in the treated aldehyde-based resin and the cured resin coating. Therefore, the increased hydrogen bonding can provide greater strength and hardness to the treated aldehyde-based resin and the cured resin coating relative to the untreated aldehyde-based resin. All dry crush strengths disclosed herein were measured or determined based on the Proppant Crush Resistance Test Procedure under ISO 13503-2:2011.

The coated proppant can have a dry crush strength of about 0.1 wt %, about 0.2 wt %, about 0.3 wt %, about 0.5 wt %, about 0.7 wt %, or about 0.9 wt % to about 1 wt %, about 1.2 wt %, about 1.5 wt %, about 1.7 wt %, about 2 wt %, about 2.2 wt %, about 2.5 wt %, about 2.7 wt %, about 3 wt %, about 3.2 wt %, about 3.5 wt %, about 3.7 wt %, about 4 wt %, about 4.2 wt %, about 4.5 wt %, about 4.7 wt %, about 5 wt %, about 5.2 wt %, about 5.5 wt %, about 5.7 wt %, about 6 wt %, about 6.5 wt %, or about 7 wt %, at a pressure of about 55.2 MPa (about 8,000 psi). For example, the coated proppant can have a dry crush strength of about 0.1 wt % to about 5 wt %, about 0.1 wt % to about 4.5 wt %, about 0.1 wt % to about 4 wt %, about 0.1 wt % to about 3.5 wt %, about 0.1 wt % to about 3 wt %, about 0.1 wt % to about 2.5 wt %, about 0.1 wt % to about 2 wt %, about 0.1 wt % to about 1.5 wt %, about 0.1 wt % to about 1 wt %, about 0.1 wt % to about 0.5 wt %, at a pressure of about 55.2 MPa. In some examples, the coated proppant can have a dry crush strength of about 0.2 wt % to about 5 wt %, about 0.2 wt % to about 4.5 wt %, about 0.2 wt % to about 4 wt %, about 0.2 wt % to about 3.5 wt %, about 0.2 wt % to about 3 wt %, about 0.2 wt % to about 2.5 wt %, about 0.2 wt % to about 2 wt %, about 0.2 wt % to about 1.5 wt %, about 0.2 wt % to about 1 wt %, about 0.2 wt % to about 0.5 wt %, at a pressure of about 55.2 MPa. In other examples, the coated proppant can have a dry crush strength of about 0.5 wt % to less than 5 wt %, about 0.5 wt % to less than 4.5 wt %, about 0.5 wt % to less than 4 wt %, about 0.5 wt % to less than 3.5 wt %, about 0.5 wt % to less than 3 wt %, about 0.5 wt % to less than 2.5 wt %, about 0.5 wt % to less than 2 wt %, about 0.5 wt % to less than 1.5 wt %, or about 0.5 wt % to less than 1 wt %, the at a pressure of about 55.2 MPa.

The coating on the coated proppant can have a thickness of about 0.1 mil (2.54 μm), about 0.2 mil (5.08 μm), about 0.3 mil (7.62 μm), about 0.5 mil (12.7 μm), about 0.7 mil (17.8 μm), or about 0.9 mil (22.9 μm), to about 1 mil (25.4 μm), about 2 mil (50.8 μm), about 3 mil (76.2 μm), about 4 mil (102 μm), about 5 mil (127 μm), about 6 mil (152 μm), about 7 mil (178 μm), about 8 mil (203 μm), about 9 mil (229 μm), about 10 mil (254 μm), about 15 mil (381 μm), about 20 mil (508 μm), or greater. For example, the coating on the coated proppant can have a thickness of about 0.1 mil (2.54 μm) to about 20 mil (508 μm), about 0.1 mil (2.54 μm) to about 10 mil (254 μm), or about 0.1 mil (2.54 μm) to about 5 mil (127 μm). In some examples, the coated proppant can have a cured resin coating with a thickness of about 0.1 mil (2.54 μm) to about 10 mil (254 μm) or about 0.1 mil (2.54 μm) to about 5 mil (127 μm).

The amount or weight of the cured resin coating on the coated proppants can be based on the weight of the uncoated particle. The coated proppants can include the treated aldehyde-based resin in an amount of about 0.5 wt %, about 0.7 wt %, about 0.9 wt %, or about 1 wt % to about 1.1 wt %, about 1.3 wt %, about 1.5 wt %, about 1.7 wt %, about 2 wt %, about 2.1 wt %, about 2.3 wt %, about 2.5 wt %, about 2.7 wt %, about 2.9 wt %, about 3 wt %, about 3.1 wt %, about 3.3 wt %, about 3.5 wt %, about 3.7 wt %, about 3.9 wt %, about 4 wt %, about 4.1 wt %, about 4.3 wt %, about 4.5 wt %, about 4.7 wt %, about 4.9 wt %, about 5 wt %, about 5.5 wt %, about 6 wt %, about 6.5 wt %, about 7 wt %, about 7.5 wt %, about 8 wt %, about 8.5 wt %, about 9 wt %, about 10 wt %, about 11 wt %, about 12 wt %, or greater, based on a dry weight of the particles. For example, the coated proppants coating can include the treated aldehyde-based resin in an amount of about 0.5 wt % to about 12 wt %, about 1 wt % to about 10 wt %, about 1 wt % to about 8 wt %, about 1 wt % to about 6 wt %, about 1 wt % to about 5 wt %, about 2 wt % to about 10 wt %, about 2 wt % to about 8 wt %, about 2 wt % to about 6 wt %, about 2 wt % to about 5 wt %, about 3 wt % to about 10 wt %, about 3 wt % to about 8 wt %, about 3 wt % to about 6 wt %, or about 3 wt % to about 5 wt %, based on a dry weight of the particles.

The amount or weight of the cured resin coating on the coated proppants can also be based on the total weight of the cured resin coating and the uncoated particle. The amount or weight of the coating on the coated proppant can be about 0.2 wt %, about 0.5 wt %, about 0.7 wt %, about 0.9 wt %, or about 1 wt % to about 5 wt %, about 6 wt %, about 7 wt %, about 8 wt %, about 9 wt %, about 10 wt %, or about 12 wt %, based on the total weight of the coating and the particle. For example, the coating on the coated proppant can be about 0.2 wt % to about 12 wt %, about 0.5 wt % to about 10 wt %, about 0.5 wt % to about 5 wt %, about 1 wt % to about 12 wt %, about 1 wt % to about 10 wt %, or about 1 wt % to about 5 wt % of the coated proppant, based on the total weight of the cured resin coating and the particles. In some examples, the coated proppant can have a cured resin coating that can be about 0.5 wt % to about 10 wt % or about 1 wt % to about 12 wt % of the coated proppant, based on the total weight of the cured resin coating and the particles.

The coated particles can have a mesh size (or equivalent average particle size) of about 230 (about 63 μm), about 200 (about 75 μm), about 120 (about 125 μm), or about 100 (about 150 μm) to about 80 (about 180 μm), about 60 (about 250 μm), about 40 (about 425 μm), about 30 (about 600 μm), about 20 (about 850 μm), about 10 (about 2 mm), about 8 (about 2.38 mm), about 6 (about 3.36 mm), or about 4 (about 4.76 mm). For example, the coated particles can have a mesh size (or equivalent average particle size) of about 200 (about 75 μm) to about 4 (about 4.76 mm), about 200 (about 75 μm) to about 6 (about 3.36 mm), about 200 (about 75 μm) to about 20 (about 850 μm), about 200 (about 75 μm) to about 80 (about 180 μm), about 100 (about 150 μm) to about 4 (about 4.76 mm), about 100 (about 150 μm) to about 6 (about 3.36 mm), about 100 (about 150 μm) to about 20 (about 850 μm), or about 100 (about 150 μm) to about 80 (about 180 μm).

The coated particles can have a mesh size (or equivalent average particle size) of about 100 (about 150 μm), about 80 (about 180 μm), or about 60 (about 250 μm) to about 40 (about 425 μm), about 30 (about 600 μm), about 20 (about 850 μm), about 10 (about 2 mm), about 8 (about 2.38 mm), about 6 (about 3.36 mm), or about 4 (about 4.76 mm). For example, the coated particles can have a mesh size (or equivalent average particle size) of about 100 (about 150 μm) to about 4 (about 4.76 mm), about 100 (about 150 μm) to about 6 (about 3.36 mm), about 100 (about 150 μm) to about 20 (about 850 μm), about 80 (about 180 μm) to about 4 (about 4.76 mm), about 80 (about 180 μm) to about 6 (about 3.36 mm), about 80 (about 180 μm) to about 20 (about 850 μm), about 60 (about 250 μm) to about 4 (about 4.76 mm), about 60 (about 250 μm) to about 8 (about 2.38 mm), or about 60 (about 250 μm) to about 20 (about 850 μm). In some specific examples, the coated particles can have a mesh size (or equivalent average particle size) of about 40 (about 425 μm) to about 4 (about 4.76 mm), about 40 (about 425 μm) to about 20 (about 850 μm), about 20 (about 850 μm) to about 4 (about 4.76 mm), or about 10 (about 2 mm) to about 4 (about 4.76 mm).

The cured resin coating can include one or more cross-linkers. Illustrative cross-linker can be or include, but are not limited to, hexamethylenetetramine, bismethylol cresols, bisoxazolines (e.g., BOX or PyBOX class of ligands), bisbenzoxazines, solid resole polymers or resins, isomers thereof, solutions thereof, or any mixture thereof. In some examples, the cross-linker can be or include hexamethylenetetramine. The cured resin coating can include the cross-linker in an amount of about 1 wt %, about 2 wt %, about 3 wt %, about 4 wt %, or about 5 wt % to about 6 wt %, about 8 wt %, about 10 wt %, about 11 wt %, about 12 wt %, about 13 wt %, about 15 wt %, about 16 wt %, about 18 wt %, about 20 wt %, about 22 wt %, about 24 wt %, about 25 wt %, about 26 wt %, about 28 wt %, or about 30 wt %, based on a solids weight of the treated aldehyde-based resin. For example, the cured resin coating can include the cross-linker in an amount of about 1 wt % to about 30 wt %, about 2 wt % to about 20 wt %, about 3 wt % to about 20 wt %, about 4 wt % to about 20 wt %, about 5 wt % to about 20 wt %, about 8 wt % to about 20 wt %, about 10 wt % to about 20 wt %, about 2 wt % to about 15 wt %, about 3 wt % to about 15 wt %, about 4 wt % to about 15 wt %, about 5 wt % to about 15 wt %, about 8 wt % to about 15 wt %, or about 10 wt % to about 15 wt %, based on a solids weight of the treated aldehyde-based resin.

In other examples, the cured resin coating can include the cross-linker in an amount of about 0.05 wt %, about 0.07 wt %, about 0.09 wt %, or about 0.1 wt % to about 0.15 wt %, about 0.2 wt %, about 0.25 wt %, about 0.3 wt %, about 0.35 wt %, about 0.4 wt %, about 0.45 wt %, about 0.5 wt %, about 0.55 wt %, about 0.6 wt %, about 0.65 wt %, about 0.7 wt %, about 0.75 wt %, about 0.8 wt %, about 0.9 wt %, about 1 wt %, about 1.1 wt %, about 1.2 wt %, about 1.3 wt %, about 1.5 wt %, about 1.7 wt %, about 1.9 wt %, about 2 wt %, about 2.5 wt %, about 3 wt %, about 4 wt %, or about 5 wt %, based on a dry weight of the particles. For example, the cured resin can include the cross-linker in an amount of about 0.05 wt % to about 5 wt %, about 0.1 wt % to about 5 wt %, about 0.1 wt % to about 4 wt %, about 0.1 wt % to about 3 wt %, about 0.1 wt % to about 2 wt %, about 0.1 wt % to about 1 wt %, about 0.1 wt % to about 0.8 wt %, about 0.1 wt % to about 0.5 wt %, about 0.1 wt % to about 0.4 wt %, about 0.1 wt % to about 0.3 wt %, about 0.1 wt % to about 0.2 wt %, about 0.2 wt % to about 0.8 wt %, about 0.2 wt % to about 0.6 wt %, about 0.2 wt % to about 0.4 wt %, based on a dry weight of the particles.

The coated proppants discussed and described herein can be utilized in processes and applications, such as, but not limited to, hydraulic fracturing, gravel packing, and/or well formation treatments. In some examples, a method for treating a subterranean formation can include introducing a fluid that contains a plurality of coated proppants into a wellbore, and introducing the plurality of coated proppants into the subterranean formation via the wellbore. Each coated proppant can include the cured resin coating at least partially or completely encasing or coating one or more particles.

In some examples, the method can include servicing the subterranean formation with the plurality of coated proppants. The subterranean formation can be serviced with the coated proppants by introducing the coated proppants into desirable portions or areas of the wellbores and/or the subterranean formations, such as in fractures, cracks, holes, openings, and other orifices within the wellbores and/or the subterranean formations including the sidewalls or surfaces thereof. The proppants can be used in processes or treatments typically performed in wellbores and/or subterranean formations, including, but not limited to, hydraulic fracturing, gravel packing, and well formation treatments.

An agglomerated framework of coated proppants in the subterranean formation can reduce solid particle flow-back and/or the transport of formation fines from the subterranean formation. Additional details related to methods for using the coated proppants having the cured resin coating can include those discussed and described in U.S. Pat. Nos. 8,003,214; 8,133,587; and 8,778,495.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

For Examples 1-5, the polyamines used to produce the treated novolac resins were diethylenetriamine (DETA) and 1,4-diaminobenzene (also known as p-diaminobenzene (PDAB or p-DAB) or p-phenylenediamine (PPD)). The dibasic ester-2 (also known as DBE-2) contained a mixture of dimethyl glutarate and dimethyl adipate and was acquired from Invista. The synthetic wax was KEMAMIDE® EBS PRL wax, acquired from Supreme Resources.

The product properties for Examples 1-5 are provided in Table 1. Gel Permeation Chromatography (GPC) was used to obtain the data for determining the molecular weight distribution. The number average molecular weight ($M_n$), the weight average molecular weight ($M_w$), and the z-average molecular weight ($M_z$), for the treated novolac resins are provided in Table 1.

Base PF Resin—

In a 2 L glass resin kettle equipped with a temperature controlled heating mantle, thermometer, and agitator, was charged with about 656 g of phenol, about 1.5 g of sulfuric acid, and about 1.1 g of water. The mixture was stirred and heated to a temperature of about 85° C. About 291 g of formaldehyde was added over a period of about 1 hr to the mixture, thereafter, the mixture was refluxed for about 2 hr. About 4 g of aniline and about 3.8 g of formaldehyde were sequentially added to the mixture. After the mixture was refluxed for about 30 min, about 4 g of ammonium hydroxide was added to neutralize the reaction mixture. The reaction mixture was vacuum distilled at about 162° C. to remove excess water and phenol until the final phenol content was less than 1 wt %. The reaction mixture was cooled to about 150° C. About 3.3 g of aminosilanes, about 13.2 g of DBE-2, about 6.2 g of salicylic acid, and about 15.6 g of synthetic wax were sequentially added to the reaction mixture. While hot, the molten resin was poured onto an aluminum pan, cooled to ambient temperature (about 23° C.), and solidified into a thin sheet having a thickness of about 6 mm. The resin sheet was struck with a hammer to break the resin sheet into pieces to form a base PF resin.

Example 1

A 2 L glass resin kettle equipped with a temperature controlled heating mantle, thermometer, and agitator, was charged with about 1,000 g of the base PF resin in chunk or flake form (prepared as described above). The heating mantel was turned on and the base PF resin within the kettle was heated to a temperature of about 137° C. After heating for about 30 min, the base PF resin melted into a liquid state. About 50 g of PDAB (about 5 wt % of the base PF resin) in powder form was added to the melted base PF resin at about 137° C. The mixture was agitated and heated to about 140° C. to disperse and melt the PDAB. After agitating and heating for about 30 min, the molten mixture was poured out of the kettle onto a cooling pan lined in aluminum foil. The molten resin cooled to ambient temperature (about 23° C.) and solidified into a thin sheet having a thickness of about 6 mm. The resin sheet was struck with a hammer to break the resin sheet into pieces of about 1 cm×about 1 cm×about 0.6 cm. The treated novolac resin was translucent and had a darker in color than the starting base PF resin.

Example 2

In a 2 L glass resin kettle equipped with a temperature controlled heating mantle, thermometer, and agitator, was charged with about 656 g of phenol, about 1.5 g of sulfuric acid, and about 1.1 g of water. The mixture was stirred and heated to a temperature of about 85° C. About 291 g of formaldehyde was added over a period of about 1 hr to the mixture, thereafter, the mixture was refluxed for about 2 hr. About 4 g of PDAB and about 3.8 g of formaldehyde were sequentially added to the mixture. After the mixture was refluxed for about 30 min, about 4 g of ammonium hydroxide was added to neutralize the reaction mixture. The reaction mixture was vacuum distilled at about 162° C. to remove excess water and phenol until the final phenol content was less than 1 wt %. The reaction mixture was cooled to about 150° C. About 3.3 g of aminosilanes, about 13.2 g of DBE-2, about 6.2 g of salicylic acid, and about 15.6 g of synthetic wax were sequentially added to the reaction mixture. While hot, the molten resin was poured onto an aluminum pan, cooled to ambient temperature (about 23° C.), and solidified into a thin sheet having a thickness of about 6 mm. The resin sheet was struck with a hammer to break the resin sheet into pieces of about 1 cm×about 1 cm×about 0.6 cm. A sample of the treated novolac resin was analyzed via GPC and the molecular weight distribution was determined as follows: the $M_w$ was about 857 g/mol, the $M_n$ was about 4,845 g/mol, and the $M_z$ was about 71,578 g/mol.

Example 3

In a 2 L glass resin kettle equipped with a temperature controlled heating mantle, thermometer, and agitator, was charged with about 656 g of phenol, about 1.5 g of sulfuric acid, and about 1.1 g of water. The mixture was stirred and heated to a temperature of about 85° C. About 291 g of formaldehyde was added over a period of about 1 hr to the mixture, thereafter, the mixture was refluxed for about 2 hr. About 2.3 g of PDAB and about 3.8 g of formaldehyde were sequentially added to the mixture. After the mixture was refluxed for about 30 min, about 4 g of ammonium hydroxide was added to neutralize the reaction mixture. The reaction mixture was vacuum distilled at about 162° C. to remove excess water and phenol until the final phenol content was less than 1 wt %. The reaction mixture was cooled to about 150° C. About 3.3 g of aminosilanes, about 13.2 g of DBE-2, about 6.2 g of salicylic acid, and about 15.6 g of synthetic wax were sequentially added to the reaction mixture. While hot, the molten resin was poured onto an aluminum pan, cooled to ambient temperature (about 23° C.), and solidified into a thin sheet having a thickness of about 6 mm. The resin sheet was struck with a hammer to break the resin sheet into pieces of about 1 cm×about 1 cm×about 0.6 cm. A sample of the treated novolac resin was analyzed via GPC and the molecular weight distribution was determined as follows: the $M_w$ was about 830 g/mol, the $M_n$ was about 5,125 g/mol, and the $M_z$ was about 76,329 g/mol.

Example 4

In a 2 L glass resin kettle equipped with a temperature controlled heating mantle, thermometer, and agitator, was charged with about 656 g of phenol, about 1.5 g of sulfuric acid, and about 1.1 g of water. The mixture was stirred and heated to a temperature of about 85° C. About 291 g of formaldehyde was added over a period of about 1 hr to the mixture, thereafter, the mixture was refluxed for about 2 hr. About 2.22 g of DETA (one half molar equivalent relative to aniline) and about 3.8 g of formaldehyde were sequentially added to the mixture. After the mixture was refluxed for about 30 min, about 4 g of ammonium hydroxide was added to neutralize the reaction mixture. The reaction mixture was vacuum distilled at about 162° C. to remove excess water and phenol until the final phenol content was less than 1 wt %. The reaction mixture was cooled to about 150° C. About 3.3 g of aminosilanes, about 13.2 g of DBE-2, about 6.2 g of salicylic acid, and about 15.6 g of synthetic wax were sequentially added to the reaction mixture. While hot, the molten resin was poured onto an aluminum pan, cooled to ambient temperature (about 23° C.), and solidified into a thin sheet having a thickness of about 6 mm. The resin sheet was struck with a hammer to break the resin sheet into pieces of about 1 cm×about 1 cm×about 0.6 cm. A sample of the treated novolac resin was analyzed via GPC and the molecular weight distribution was determined as follows: the $M_w$ was about 894 g/mol, the $M_n$ was about 2,673 g/mol, and the $M_z$ was about 7,102 g/mol.

Example 5

In a 2 L glass resin kettle equipped with a temperature controlled heating mantle, thermometer, and agitator, was charged with about 656 g of phenol, about 1.5 g of sulfuric acid, and about 1.1 g of water. The mixture was stirred and heated to a temperature of about 85° C. About 291 g of formaldehyde was added over a period of about 1 hr to the mixture, thereafter, the mixture was refluxed for about 2 hr. About 2.22 g of DETA (one half molar equivalent relative to aniline) and about 3.8 g of formaldehyde were sequentially added to the mixture. After the mixture was refluxed for about 30 min, about 4 g of ammonium hydroxide was added to neutralize the reaction mixture. The reaction mixture was vacuum distilled at about 162° C. to remove excess water and phenol until the final phenol content was less than 1 wt %. The reaction mixture was cooled to about 150° C. About 3.3 g of aminosilanes, about 13.2 g of DBE-2, about 6.2 g of salicylic acid, and about 15.6 g of synthetic wax were sequentially added to the reaction mixture. While hot, the molten resin was poured onto an aluminum pan, cooled to ambient temperature (about 23° C.), and solidified into a thin sheet having a thickness of about 6 mm. The resin sheet was struck with a hammer to break the resin sheet into pieces of about 1 cm×about 1 cm×about 0.6 cm. A sample of the treated novolac resin was analyzed via GPC and the molecular weight distribution was determined as follows: the $M_w$ was about 882 g/mol, the $M_n$ was about 2,699 g/mol, and the $M_z$ was about 7,120 g/mol.

TABLE 1

Treated resin Synthesis Results

| Ex | Polyamine | Amount of Polyamine (wt %*) | $M_w$ (g/mol) | $M_n$ (g/mol) | $M_z$ (g/mol) |
|---|---|---|---|---|---|
| 1 | PDAB | 4.76 | — | — | — |
| 2 | PDAB | 0.4 | 857 | 4,845 | 71,578 |
| 3 | PDAB | 0.23 | 830 | 5,125 | 76,329 |
| 4 | DETA | 0.22 | 894 | 2,673 | 7,102 |
| 5 | DETA | 0.22 | 882 | 2,699 | 7,120 |

*wt % is based on a solids weight of the PF resin

For Examples 6-12, proppants were produced by coating sand particles with PF resins. Specifically, in Examples 7 and 9-12, sand particles were coated with the treated novolac resins prepared in Experiments 1-5, respectively, and in Examples 6 and 8, sand particles were coated with the base PF resin, as comparative examples. The sand used was 20/40 frac sand, commercially available from Unimin Corporation. The "hexamine solution" used was an aqueous solution containing about 40 wt % of hexamethylenetetramine and about 60 wt % of water. All dry crush strength values measured in Examples 6-12 were determined based on the Proppant Crush Resistance Test Procedure under ISO 13503-2:2011.

Comparative Example 6

About 2,000 g of sand (preheated to about 260° C.) and about 60 g of the base PF resin were added to a 19 L capacity mixer. The mixer was run for about 45 sec and over the next 15 sec about 18.2 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 3.7 wt % at about 8,000 MPa and about 10.7 wt % at about 12,000 MPa.

Example 7

About 2,000 g of sand (preheated to about 260° C.) and about 60 g of the Example 1 treated novolac resin were added to a 19 L capacity mixer. The mixer was run for about 45 sec and over the next 15 sec about 18.2 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 2.9 wt % at about 8,000 MPa and about 8.3 wt % at about 12,000 MPa.

Comparative Example 8

About 2,000 g of sand (preheated to about 260° C.) and about 60 g of the base PF resin were added to a 19 L capacity mixer. After the mixer was run for about 30 sec, about 9 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 2.3 wt % at about 8,000 MPa.

Example 9

About 2,000 g of sand (preheated to about 260° C.) and about 60 g of the Example 2 treated novolac resin were added to a 19 L capacity mixer. After the mixer was run for about 30 sec, about 9 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 2 wt % at about 8,000 MPa.

Example 10

About 2,000 g of sand (preheated to about 260° C.) and about 60 g of the Example 3 treated novolac resin were added to a 19 L capacity mixer. After the mixer was run for about 30 sec, about 9 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 1.9 wt % at about 8,000 MPa.

Example 11

About 2,000 g of sand (preheated to about 260° C.) and about 60 g of the Example 4 treated novolac resin were added to a 19 L capacity mixer. After the mixer was run for about 30 sec, about 9 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 2.2 wt % at about 8,000 MPa.

Example 12

About 2,000 g of sand (preheated to about 260° C.) and about 60 g of the Example 5 treated novolac resin were added to a 19 L capacity mixer. After the mixer was run for about 30 sec, about 9 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C. The dry crush value was determined to be about 1.5 wt % at about 8,000 MPa.

The proppants (coated sand particles) were sieved using two sieves—a sieve with an average particle size of about 850 μm (a #20 mesh sieve) and a sieve with an average particle size of about 0.4 mm (a #40 mesh sieve). A sample of about 15 g of the sieved proppants was loaded into the test cell, constantly moving the test cell until a leveled surface of proppants was obtained. A press with a piston was used to apply stress to the sample in the test cell. The piston was inserted into the test cell and the press applied stress to the sample in the test cell. The stress was increased at a constant rate until the desired stress was achieved—either about 55.2 MPa (about 8,000 psi, in Examples 6-12) or about 82.7 MPa (about 12,000 psi, in Examples 6-7). The sample was held at the desired stress for about 2 min. The crushed coated proppant was sieved and the amount of fines produced was reported. The results for Examples 6-12 are provided in Table 2.

Example 13

About 2,000 g of sand (preheated to about 260° C.), about 60 g of the base PF resin, and about 3 g of PDAB (about 5 wt % of the base PF resin) in powder form were added to a 19 L capacity mixer. The mixer was run for about 45 sec and over the next 15 sec about 18.2 g of hexamine solution was added to the mixture. The mixture was continuously mixed until 3 min had elapsed from when the resin was added to the mixture. Thereafter, the coated proppants were discharged from the mixer and allowed to cool in the ambient to about 23° C.

TABLE 2

Dry Crush Strength of Coated Proppant

| Examples | PF resin (Exp #) | Dry Crush (wt %) | Crush Pressure (MPa) |
|---|---|---|---|
| CEx. 6 | base resin | 3.7 | 55.2 |
|  |  | 10.7 | 82.7 |
| Ex. 7 | Ex. 1 | 2.9 | 55.2 |
|  |  | 8.3 | 82.7 |
| CEx. 8 | base resin | 2.3 | 55.2 |
| Ex. 9 | Ex. 2 | 2 | 55.2 |
| Ex. 10 | Ex. 3 | 1.9 | 55.2 |
| Ex. 11 | Ex. 4 | 2.2 | 55.2 |
| Ex. 12 | Ex. 5 | 1.5 | 55.2 |

Embodiments of the present disclosure further relate to any one or more of the following paragraphs:

1. A treated aldehyde-based resin, comprising: an aldehyde-based resin; and a polyamine comprising an aromatic polyamine, a poly($C_2$-$C_5$ alkylene) polyamine, or a mixture thereof, wherein the treated aldehyde-based resin comprises about 0.05 wt % to about 10 wt % of the polyamine, based on a solids weight of the aldehyde-based resin.

2. A method for making a treated aldehyde-based resin, comprising: mixing, adding together, or combining an aldehyde-based resin and a polyamine to produce a mixture, wherein the polyamine comprises an aromatic polyamine, a poly($C_2$-$C_5$ alkylene) polyamine, or a mixture thereof, and wherein the mixture comprises about 0.05 wt % to about 10 wt % of the polyamine, based on a solids weight of the aldehyde-based resin; heating the mixture to a temperature of about 110° C. to about 200° C. to produce the treated aldehyde-based resin; and cooling the treated aldehyde-based resin to a temperature of less than 50° C.

3. A method for making a treated aldehyde-based resin, comprising: mixing, adding together, or combining formaldehyde and a reagent to produce a first mixture, wherein the reagent comprises phenol, urea, or a mixture thereof; heating the first mixture to produce an aldehyde-based resin; mixing, adding together, or combining the aldehyde-based resin and a polyamine to produce a second mixture, wherein the polyamine comprises an aromatic polyamine, a poly($C_2$-$C_5$ alkylene) polyamine, or a mixture thereof, and wherein the second mixture comprises about 0.05 wt % to about 10 wt % of the polyamine, based on a solids weight of the aldehyde-based resin; heating the second mixture to a temperature of about 110° C. to about 200° C. for about 5 minutes to about 90 minutes to produce the treated aldehyde-based resin; and cooling the treated aldehyde-based resin to a temperature of less than 50° C. to solidify the treated aldehyde-based resin.

4. A method for making a treated aldehyde-based resin, comprising: heating a solid aldehyde-based resin to produce a molten aldehyde-based resin; mixing, adding together, or combining a polyamine and the molten aldehyde-based resin to produce a molten resin mixture, wherein the aldehyde-based resin comprises a phenol-formaldehyde resin, a urea-formaldehyde resin, or a mixture thereof, and wherein the polyamine comprises an aromatic polyamine, a poly($C_2$-$C_5$ alkylene) polyamine, or a mixture thereof heating the molten resin mixture to a temperature of about 120° C. to about 160° C. for about 10 minutes to about 60 minutes to produce the treated aldehyde-based resin; and cooling the treated aldehyde-based resin to solidify the treated aldehyde-based resin.

5. The treated aldehyde-based resin or the method according to any one of paragraphs 1-4, wherein the treated aldehyde-based resin or the mixture comprises about 0.1 wt % to about 1.5 wt % of the polyamine, based on a solids weight of the aldehyde-based resin.

6. The treated aldehyde-based resin or the method according to any one of paragraphs 1-5, wherein the treated aldehyde-based resin or the mixture comprises about 2 wt % to about 8 wt % of the polyamine, based on a solids weight of the aldehyde-based resin.

7. The treated aldehyde-based resin or the method according to any one of paragraphs 1-6, wherein the aldehyde-based resin comprises a phenol-formaldehyde resin, a urea-formaldehyde resin, a melamine-formaldehyde resin, a resorcinol-formaldehyde resin, a melamine-urea-formaldehyde resin, a phenol-urea-formaldehyde resin, a phenol-melamine-formaldehyde resin, a phenol-resorcinol-formaldehyde resin, a copolymer thereof, or any mixture thereof.

8. The treated aldehyde-based resin or the method according to any one of paragraphs 1-7, wherein the aldehyde-based resin comprises a phenol-formaldehyde novolac resin, a copolymer thereof, or a mixture thereof.

9. The treated aldehyde-based resin or the method according to any one of paragraphs 1-8, wherein the mixture is heated to a temperature of about 120° C. to about 160° C. for about 10 minutes to about 60 minutes to produce the treated aldehyde-based resin.

10. The treated aldehyde-based resin or the method according to any one of paragraphs 1-9, wherein the treated aldehyde-based resin is cooled to a temperature of about 20° C. to about 30° C. to solidify the treated aldehyde-based resin.

11. The treated aldehyde-based resin or the method according to any one of paragraphs 1-10, wherein the mixture is heated to a temperature of about 120° C. to about 160° C. for about 10 minutes to about 60 minutes to produce the treated aldehyde-based resin, and wherein the treated aldehyde-based resin is cooled to a temperature of about 20° C. to about 30° C. to solidify the treated aldehyde-based resin.

12. The treated aldehyde-based resin or the method according to any one of paragraphs 1-11, further comprising: reacting formaldehyde and a reagent to produce the aldehyde-based resin.

13. The treated aldehyde-based resin or the method according to any one of paragraphs 1-12, further comprising reacting formaldehyde and a reagent to produce the aldehyde-based resin, wherein the reagent comprises phenol, urea, or a mixture thereof.

14. The treated aldehyde-based resin or the method according to any one of paragraphs 1-13, further comprising: reacting formaldehyde and a reagent to produce the aldehyde-based resin; and adding the polyamine to the aldehyde-based resin to produce the mixture.

15. The treated aldehyde-based resin or the method according to any one of paragraphs 1-14, further comprising: reacting formaldehyde and a reagent to produce the aldehyde-based resin, wherein the reagent comprises phenol, urea, or a mixture thereof and adding the polyamine to the aldehyde-based resin to produce the mixture.

16. The treated aldehyde-based resin or the method according to any one of paragraphs 1-15, further comprising: heating a solid aldehyde-based resin to produce a molten aldehyde-based resin; and combining and agitating the molten aldehyde-based resin and the polyamine to produce the mixture.

17. The treated aldehyde-based resin or the method according to any one of paragraphs 1-16, wherein the aldehyde-based resin is heated to a temperature of about 110° C. to about 200° C. to produce the molten aldehyde-based resin, and wherein the polyamine is a solid when added to the molten aldehyde-based resin.

18. The treated aldehyde-based resin or the method according to any one of paragraphs 1-17, wherein the polyamine comprises an aromatic diamine, an aromatic triamine, a dialkylenetriamine, a trialkylenetetraamine, or any mixture thereof.

19. The treated aldehyde-based resin or the method according to any one of paragraphs 1-18, wherein the polyamine comprises the aromatic polyamine, and wherein the aromatic polyamine comprises 1,3-diaminobenzene, 1,4-diaminobenzene, 1,3-xylylenediamine, 1,4-xylylenediamine, 3,4'-diaminodiphenyl ether, 4,4'-diaminodiphenyl ether, an isomer thereof, a salt thereof, a complex thereof, an adduct thereof, or any mixture thereof.

20. The treated aldehyde-based resin or the method according to any one of paragraphs 1-19, wherein the polyamine comprises the poly($C_2$-$C_5$ alkylene) polyamine, and wherein the poly($C_2$-$C_5$ alkylene) polyamine comprises diethylenetriamine, dipropylenetriamine, dibutylenetriamine, an isomer thereof, a salt thereof, a complex thereof, an adduct thereof, or any mixture thereof.

21. The treated aldehyde-based resin or the method according to any one of paragraphs 1-20, wherein the polyamine comprises the poly($C_2$-$C_5$ alkylene) polyamine, and wherein the poly($C_2$-$C_5$ alkylene) polyamine comprises a dialkylenetriamine.

22. The treated aldehyde-based resin or the method according to any one of paragraphs 1-21, wherein the treated aldehyde-based resin further comprises a wax, a dibasic ester, or a mixture thereof.

23. The treated aldehyde-based resin or the method according to any one of paragraphs 1-22, wherein the formaldehyde is added to the reagent to produce the first mixture.

24. The treated aldehyde-based resin or the method according to any one of paragraphs 1-23, wherein the polyamine is added to the aldehyde-based resin to produce the second mixture.

25. The treated aldehyde-based resin or the method according to any one of paragraphs 1-24, wherein the formaldehyde is added to the reagent to produce the first mixture, and wherein the polyamine is added to the aldehyde-based resin to produce the second mixture.

26. The treated aldehyde-based resin or the method according to any one of paragraphs 1-25, wherein the second mixture is produced by adding the polyamine and an additional amount of formaldehyde to the aldehyde-based resin.

27. The treated aldehyde-based resin or the method according to any one of paragraphs 1-26, wherein the second mixture comprises about 0.1 wt % to about 1.5 wt % of the polyamine, based on a solids weight of the aldehyde-based resin.

28. The treated aldehyde-based resin or the method according to any one of paragraphs 1-27, wherein the first mixture is heated to a temperature of about 50° C. to about 100° C.

29. The treated aldehyde-based resin or the method according to any one of paragraphs 1-28, wherein the second mixture is heated to a temperature of about 110° C. to about 200° C.

30. The treated aldehyde-based resin or the method according to any one of paragraphs 1-29, wherein the first mixture is heated to a temperature of about 50° C. to about 100° C., and wherein the second mixture is heated to a temperature of about 110° C. to about 200° C.

31. The treated aldehyde-based resin or the method according to any one of paragraphs 1-30, wherein the second mixture comprises about 2 wt % to about 8 wt % of the polyamine, based on a solids weight of the aldehyde-based resin.

32. A coated proppant, comprising a particle and an at least partially cured treated resin at least partially encasing the particle, wherein prior to curing, the treated resin comprises the treated aldehyde-based resin according to any one of paragraphs 1-31.

33. A coated paper, comprising a paper sheet at least partially coated with an at least partially cured treated resin, wherein prior to curing, the treated resin comprises the treated aldehyde-based resin according to any one of paragraphs 1-31.

34. A coated sandpaper, comprising a paper sheet and a plurality of particles at least partially coated with an at least partially cured treated resin, wherein prior to curing, the treated resin comprises the treated aldehyde-based resin according to any one of paragraphs 1-31.

35. A conduct or a pipe having an inner surface coated with an at least partially cured treated resin, wherein, prior to curing, the treated resin comprises the treated aldehyde-based resin according to any one of paragraphs 1-31.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A treated aldehyde-based resin, comprising:
    an aldehyde-based resin;
    a polyamine comprising an aromatic polyamine, wherein the aromatic polyamine comprises 1,3-diaminobenzene, 1,4-diaminobenzene, 1,3-xylylenediamine, 1,4-xylylenediamine, 3,4'-diaminodiphenyl ether, 4,4'-diaminodiphenyl ether, an isomer thereof, or any mixture thereof, wherein the treated aldehyde-based resin comprises about 0.05 wt % to 0.7 wt % of the polyamine, based on a solids weight of the aldehyde-based resin; and
    an additive comprising a wax, a dibasic ester, or a mixture thereof.

2. The treated aldehyde-based resin of claim 1, wherein the treated aldehyde-based resin comprises about 0.05 wt % to 0.6 wt % of the polyamine, based on a solids weight of the aldehyde-based resin.

3. The treated aldehyde-based resin of claim 1, wherein the treated aldehyde-based resin comprises about 0.05 wt % to 0.5 wt % of the polyamine, based on a solids weight of the aldehyde-based resin.

4. The treated aldehyde-based resin of claim 1, wherein the aldehyde-based resin comprises a phenol-formaldehyde resin, a urea-formaldehyde resin, a melamine-formaldehyde resin, a resorcinol-formaldehyde resin, a melamine-urea-formaldehyde resin, a phenol-urea-formaldehyde resin, a phenol-melamine-formaldehyde resin, a phenol-resorcinol-formaldehyde resin, a copolymer thereof, or any mixture thereof.

5. The treated aldehyde-based resin of claim 1, wherein the aldehyde-based resin comprises a phenol-formaldehyde novolac resin, a copolymer thereof, or a mixture thereof.

6. The treated aldehyde-based resin of claim 1, wherein the aromatic polyamine comprises 1,4-diaminobenzene.

7. The treated aldehyde-based resin of claim 1, wherein the aromatic polyamine comprises 1,3-diaminobenzene, 1,3-xylylenediamine, 1,4-xylylenediamine, 3,4'-diaminodiphenyl ether, 4,4'-diaminodiphenyl ether, an isomer thereof, or any mixture thereof.

8. The treated aldehyde-based resin of claim 1, wherein the polyamine further comprises a poly($C_2$-$C_5$ alkylene) polyamine, and wherein the poly($C_2$-$C_5$ alkylene) polyamine comprises diethylenetriamine, dipropylenetriamine, dibutylenetriamine, an isomer thereof, or any mixture thereof.

9. The treated aldehyde-based resin of claim 1, wherein the additive comprises the mixture of the wax and the dibasic ester.

10. A method for making a treated aldehyde-based resin, comprising:
    combining an aldehyde-based resin, a polyamine, and an additive to produce a mixture, wherein the polyamine comprises an aromatic polyamine, wherein the aromatic polyamine comprises 1,3-diaminobenzene, 1,4-diaminobenzene, 1,3-xylylenediamine, 1,4-xylylenediamine, 3,4'-diaminodiphenyl ether, 4,4'-diaminodiphenyl ether, an isomer thereof, and wherein the mixture comprises about 0.05 wt % to 0.7 wt % of the polyamine, based on a solids weight of the aldehyde-based resin, and wherein the additive comprises a wax, a dibasic ester, or a mixture thereof;
    heating the mixture to a temperature of about 110° C. to about 200° C. to produce the treated aldehyde-based resin; and
    cooling the treated aldehyde-based resin to a temperature of less than 50° C.

11. The method of claim 10, wherein the mixture is heated to a temperature of about 120° C. to about 160° C. for about 10 minutes to about 60 minutes to produce the treated aldehyde-based resin, and wherein the treated aldehyde-based resin is cooled to a temperature of about 20° C. to about 30° C. to solidify the treated aldehyde-based resin.

12. The method of claim 10, further comprising:
reacting formaldehyde and a reagent to produce the aldehyde-based resin, wherein the reagent comprises phenol, urea, or a mixture thereof; and
adding the polyamine to the aldehyde-based resin to produce the mixture.

13. A method for making a treated aldehyde-based resin, comprising:
heating a solid aldehyde-based resin to a temperature of about 110° C. to about 200° C. to produce a molten aldehyde-based resin;
combining the molten aldehyde-based resin and a polyamine to produce the treated aldehyde-based resin, wherein:
the polyamine comprises an aromatic polyamine, a poly($C_2$-$C_5$ alkylene) polyamine, or a mixture thereof,
the treated aldehyde-based resin comprises about 0.05 wt % to about 10 wt % of the polyamine, based on a solids weight of the aldehyde-based resin,
the polyamine is a solid when combined with the molten aldehyde-based resin, and
the molten aldehyde-based resin and the polyamine are at a temperature of about 110° C. to about 200° C. when combined with one another; and
cooling the treated aldehyde-based resin to a temperature of less than 50° C.

14. The method of claim 10, wherein the aldehyde-based resin comprises a phenol-formaldehyde resin, a urea-formaldehyde resin, or a mixture thereof, and wherein the mixture comprises about 0.05 wt % to 0.6 wt % of the polyamine, based on a solids weight of the aldehyde-based resin.

15. The method of claim 10, wherein the aromatic polyamine comprises 1,4-diaminobenzene.

16. The method of claim 10, wherein the polyamine further comprises a poly($C_2$-$C_5$ alkylene) polyamine, and wherein the poly($C_2$-$C_5$ alkylene) polyamine comprises diethylenetriamine, dipropylenetriamine, dibutylenetriamine, an isomer thereof, or any mixture thereof.

17. A method for making a treated aldehyde-based resin, comprising:
combining formaldehyde and a reagent to produce a first mixture, wherein the reagent comprises phenol, urea, or a mixture thereof;
heating the first mixture to produce an aldehyde-based resin;
combining the aldehyde-based resin and an additive to produce a second mixture, wherein the additive comprises a wax, a dibasic ester, or a mixture thereof;
combining the second mixture and a polyamine to produce a third mixture, wherein the polyamine comprises an aromatic polyamine, a poly($C_2$-$C_5$ alkylene) polyamine, or a mixture thereof, and wherein the third mixture comprises about 0.05 wt % to 0.7 wt % of the polyamine, based on a solids weight of the aldehyde-based resin;
heating the third mixture to a temperature of about 110° C. to about 200° C. for about 5 minutes to about 90 minutes to produce the treated aldehyde-based resin; and
cooling the treated aldehyde-based resin to a temperature of less than 50° C. to solidify the treated aldehyde-based resin.

18. The method of claim 17, wherein the formaldehyde is added to the reagent to produce the first mixture, and wherein the polyamine is added to the second mixture to produce the third mixture.

19. The method of claim 17, wherein the first mixture is heated to a temperature of about 50° C. to about 100° C., and wherein the third mixture is heated to a temperature of about 110° C. to about 200° C.

20. The method of claim 17, wherein the third mixture is produced by adding the polyamine and an additional amount of formaldehyde to the second mixture, and wherein the third mixture comprises about 0.05 wt % to 0.6 wt % of the polyamine, based on a solids weight of the aldehyde-based resin.

* * * * *